(12) United States Patent
Ando

(10) Patent No.: US 7,430,416 B2
(45) Date of Patent: Sep. 30, 2008

(54) NOTIFICATION SYSTEM

(75) Inventor: Takeshi Ando, Tokyo (JP)

(73) Assignee: NEC Corporation, Tokyo (JP)

( * ) Notice: Subject to any disclaimer, the term of this patent is extended or adjusted under 35 U.S.C. 154(b) by 62 days.

(21) Appl. No.: 10/614,056

(22) Filed: Jul. 8, 2003

(65) Prior Publication Data

US 2004/0014473 A1    Jan. 22, 2004

(30) Foreign Application Priority Data

Jul. 12, 2002  (JP) ............................. 2002-204252

(51) Int. Cl.
*H04Q 7/20* (2006.01)
(52) U.S. Cl. .................... 455/432.1; 455/433
(58) Field of Classification Search ............. 455/432.1, 455/417, 432.2, 435.1, 433; 379/130; 704/257
See application file for complete search history.

(56) References Cited

U.S. PATENT DOCUMENTS

| | | | |
|---|---|---|---|
| 5,991,721 A * | 11/1999 | Asano et al. ................. | 704/257 |
| 6,138,008 A * | 10/2000 | Dunn et al. .................. | 455/417 |
| 6,192,115 B1 * | 2/2001 | Toy et al. ..................... | 379/130 |
| 6,259,914 B1 * | 7/2001 | Koster ...................... | 455/432.1 |
| 6,373,817 B1 * | 4/2002 | Kung et al. .................. | 370/217 |
| 6,535,596 B1 * | 3/2003 | Frey et al. ............... | 379/201.01 |
| 6,615,041 B2 * | 9/2003 | Adamany et al. ......... | 455/432.1 |
| 6,754,490 B2 * | 6/2004 | Okoro et al. ............. | 455/432.2 |
| 7,005,963 B1 * | 2/2006 | Scalisi et al. ................. | 340/7.1 |

FOREIGN PATENT DOCUMENTS

| | | |
|---|---|---|
| DE | 195 15 418 A1 | 10/1996 |
| EP | 0 601 710 A2 | 6/1994 |
| GB | 2 294 611 A | 5/1996 |
| GB | 2 366 947 A | 3/2002 |
| JP | 64-41554 A | 2/1989 |
| JP | 2000-50347 A | 2/2000 |
| JP | 2002-27549 A | 1/2002 |
| JP | 2002-77466 A | 3/2002 |
| JP | 2003-289580 A | 10/2003 |
| WO | WO 94/28670 A1 | 12/1994 |
| WO | WO 97/47151 A2 | 12/1997 |

* cited by examiner

*Primary Examiner*—Duc Nguyen
*Assistant Examiner*—Chuck Huynh
(74) *Attorney, Agent, or Firm*—Sughrue Mion, PLLC

(57) ABSTRACT

A notification for notifying information about a mobile station capable of using international roaming service is provided. The notification system comprises an information storing unit that stores information about a mobile station which belongs to a first network in a first country, the information including a fact whether the mobile station is moved to a second country and registered as a visitor station in the second country or not; and a notification unit that refers to the information storing unit when the mobile station is called by a caller terminal within the first network to detect whether the mobile station is registered as the visitor station in the second country or not, and notifies the caller terminal of the registration of the mobile station before a connection between the caller terminal and the mobile station is established, when the mobile station is registered as the visitor station in the second country.

11 Claims, 7 Drawing Sheets

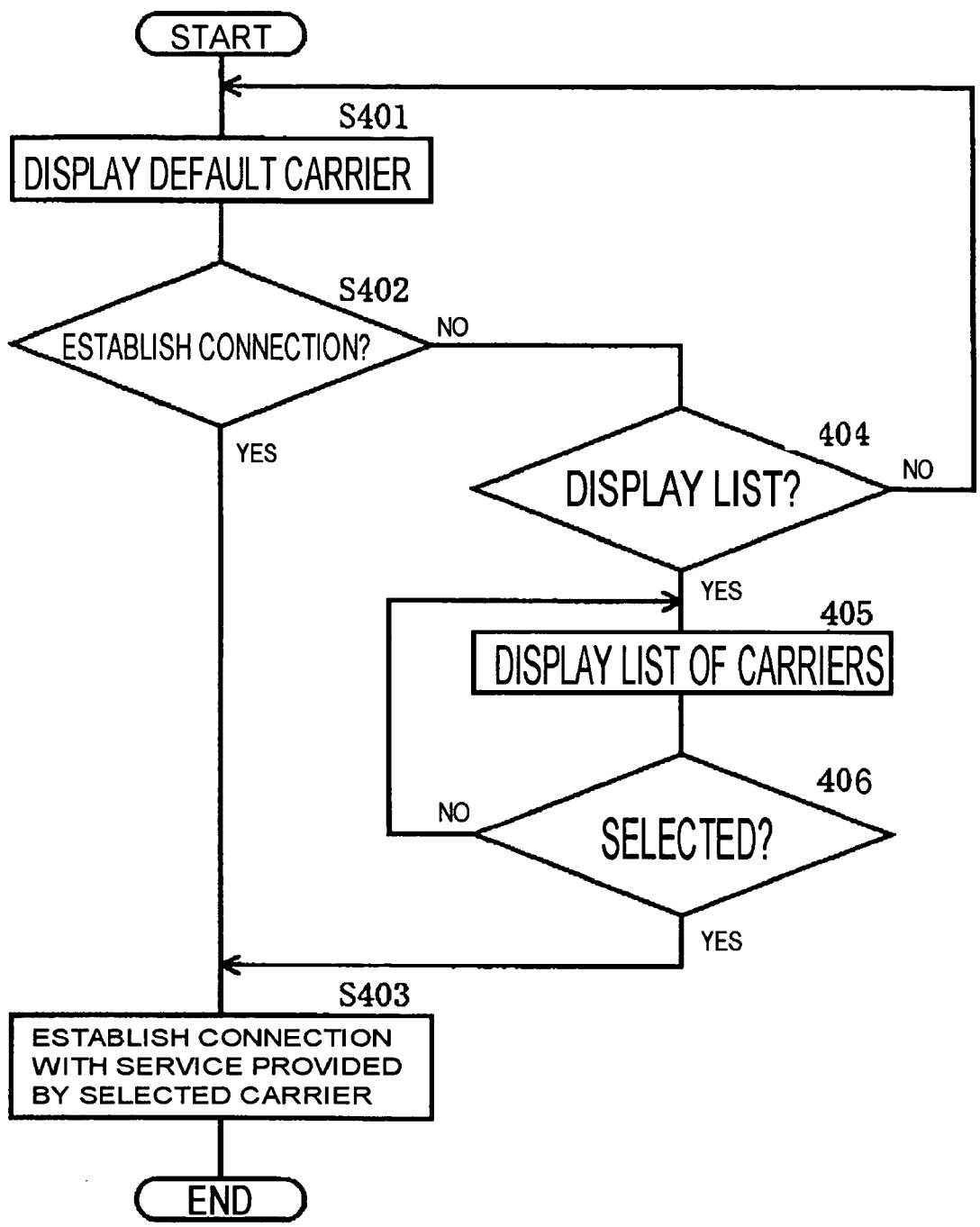

NOTIFICATION SYSTEM

This application is based on Japanese patent application NO.2002-204252, the content of which is incorporated hereinto by reference.

BACKGROUND OF THE INVENTION

1. Field of the Invention

The present invention relates to a notification system, and, in particular, to a notification system which notifies a caller of information about a called mobile station which is in a foreign county.

2. Description of the Related Art

One of the biggest differences between a fixed type telephone and a mobile station such as a mobile phone or a personal handy-phone (PHS) is that a called phone is fixed at a predetermined location or not. A person who makes a call to a fixed telephone can know where the called telephone is from the telephone number of the called telephone. Therefore, the person can predict telephone fee for having telephone conversation with the user of the called telephone.

However, a person who makes a call to a mobile station cannot know where the called phone is at the moment when he or she makes the call. Recently, people are capable of using their mobile phones in foreign countries with the international roaming services. As is disclosed in an international application whose publication number is WO 97/47151, even when a mobile station which belongs to a first country mobile network moves to a foreign country, a connection between a caller and the mobile station is established when the caller dials subscriber number of the mobile station in the first country mobile network.

In such the case, the caller can make a call and have a telephone conversation with the user of the called mobile station without knowing the user of the called mobile station is in a foreign country. As described above, it is very convenient to use the international roaming service, as a caller party and a called party can communicate with each other even when one of the parties is in a foreign country.

However, with the above international roaming system, different from conventional telephone communication system using special number, i.e. country code, for making international call, the caller may unconsciously make a call to a person who is in a foreign country. In such the case, the caller can only know the fact that he or she made the international call after being charged high amount of telephone fees.

SUMMARY OF THE INVENTION

The present invention has been made in view of the foregoing circumstances and an object thereof is to provide a system capable of notifying a caller making a call to a mobile station that is in a foreign country of the fact that the called mobile station is in a foreign country before a connection therebetween is established.

According to the present invention, there is provided a notification system for notifying information about a mobile station capable of using international roaming service. The notification system comprises an information storing unit that stores information about a mobile station which belongs to a first network in a first country, the information including a fact whether the mobile station is moved to a second country and registered as a visitor station in the second country or not; and a notification unit that refers to the information storing unit when the mobile station is called by a caller terminal within the first network to detect whether the mobile station is registered as the visitor station in the second country or not, and notifies the caller terminal of the registration of the mobile station before a connection between the caller terminal and the mobile station is established, when the mobile station is registered as the visitor station in the second country.

With this notification system, a caller can previously know that the called station is in a foreign country, in the above case the second country, before the connection between the caller terminal and the called station is established. Therefore, the caller may decide whether to continue calling operation or not after considering for example the telephone fee charged for the connection. Furthermore, the caller can know the place of the user of the called station from the information about the called station.

The notification system may further comprises a calculating unit that calculates telephone fee charged to the caller terminal when the connection between the caller terminal and the mobile station registered as the visitor station in the second country is established, wherein the notification unit notifies the caller terminal of the telephone fee calculated by the accounting unit in addition to the registration before the connection between the caller terminal and the mobile station is established, when the mobile station is registered as a visitor station in the second country.

The notification system may further comprises a location obtaining unit that obtains location of the mobile station; a visitor registration unit that registers the mobile station as a visitor station in the second country to have the mobile station capable of establishing a connection via a second network in the second country when the mobile station moves to the second country and requests for the registration; and a reporting unit that reports the registration of the mobile station to the location obtaining unit. The location obtaining unit may store information about the registration of the mobile station in the information storing unit.

The visitor registration unit may delete the registration of the mobile station as the visitor station upon receiving request from the mobile station, the reporting unit may report the deletion of the registration of the mobile station to the location obtaining unit, and the location obtaining unit may delete the information about the registration information in the information storing unit.

With these operations, the caller who knows that the called station has once registered as the visitor station in the second country can predict that the user of the called station has left the second country even when the connection is not established.

The notification system may further comprise an accounting unit that charges the caller terminal for notification of the notification unit.

With this operation, the operator of the notification system can provide this service as a business and is capable of improving service quality with the profits obtained as the charges. The notification system may have function to provide advertisements to the caller before a connection between the caller and the called station is established. In this case, the accounting unit may charge for the advertiser instead of charging the caller terminal.

The notification system may further comprises time calculation unit that calculates local time of the second country, wherein the notification unit may notify the caller terminal of the local time in addition to the registration, when the mobile station is registered as a visitor station in the second country.

With this operation, the caller can know the local time of the second country where the caller terminal is registered as the visitor station. Thus, the caller can decide whether to establish the connection after considering the local time of the second country. For example, when the local time of the second country is midnight, the caller can decide not to establish the connection or decide to change mode of the connection from conversation mode to the mail sending mode, etc.

The notification system may further comprise a translation unit that aids translation of conversations between users of the caller terminal and the mobile station.

This operation is prepared for a case when someone in the second country other than the subscriber of the called station answers the phone (called station) when the caller dials the telephone number of the called station. With this operation, the caller can communicate with a user of the called station even when the user speaks a foreign language.

The notification system may further comprise a retaining unit that temporary retains establishing a connection between the caller terminal and the mobile station.

With this operation, the caller can have time for considering whether to establish the connection with the called station when the called station is registered as the visitor station in the second county without being charged. While retaining establishing the connection, the caller can obtain information about the second country for example through INTERNET etc., and needs not to redial the telephone number of the called station when the caller decided to establish the connection.

The notification system may further comprise a mode changing unit that changes mode of a connection between the caller terminal and the mobile station from a conversation mode to a mail sending mode upon receiving a request from the caller terminal.

With this operation, the caller can change the mode of the connection from the conversation mode to a mail sending mode when the telephone fee for having conversation with the user of the called station is expensive or the local time of the second country is inappropriate for calling, for example midnight or etc. With the combination with the retaining operation as described above, the caller have time to consider which operation to take and decide whether to change the mode of the connection.

It is to be noted that any arbitrary combination of the above-described structural components, and expressions changed between a method and an apparatus are all effective as and encompassed by the present embodiments.

Moreover, this summary of the invention does not necessarily describe all necessary features so that the invention may also be sub-combination of these described features.

BRIEF DESCRIPTION OF THE DRAWINGS

FIG. 7 is a flowchart showing the operation for selecting a carrier providing connection service between countries.

PREFFERED EMBODIMENT OF THE PRESENT INVENTION

The invention will now be described based on preferred embodiments which do not intend to limit the scope of the present invention but exemplify the invention. All of the features and the combinations thereof described in the embodiment are not necessarily essential to the invention.

First Embodiment of the Present Invention

Figure 1:
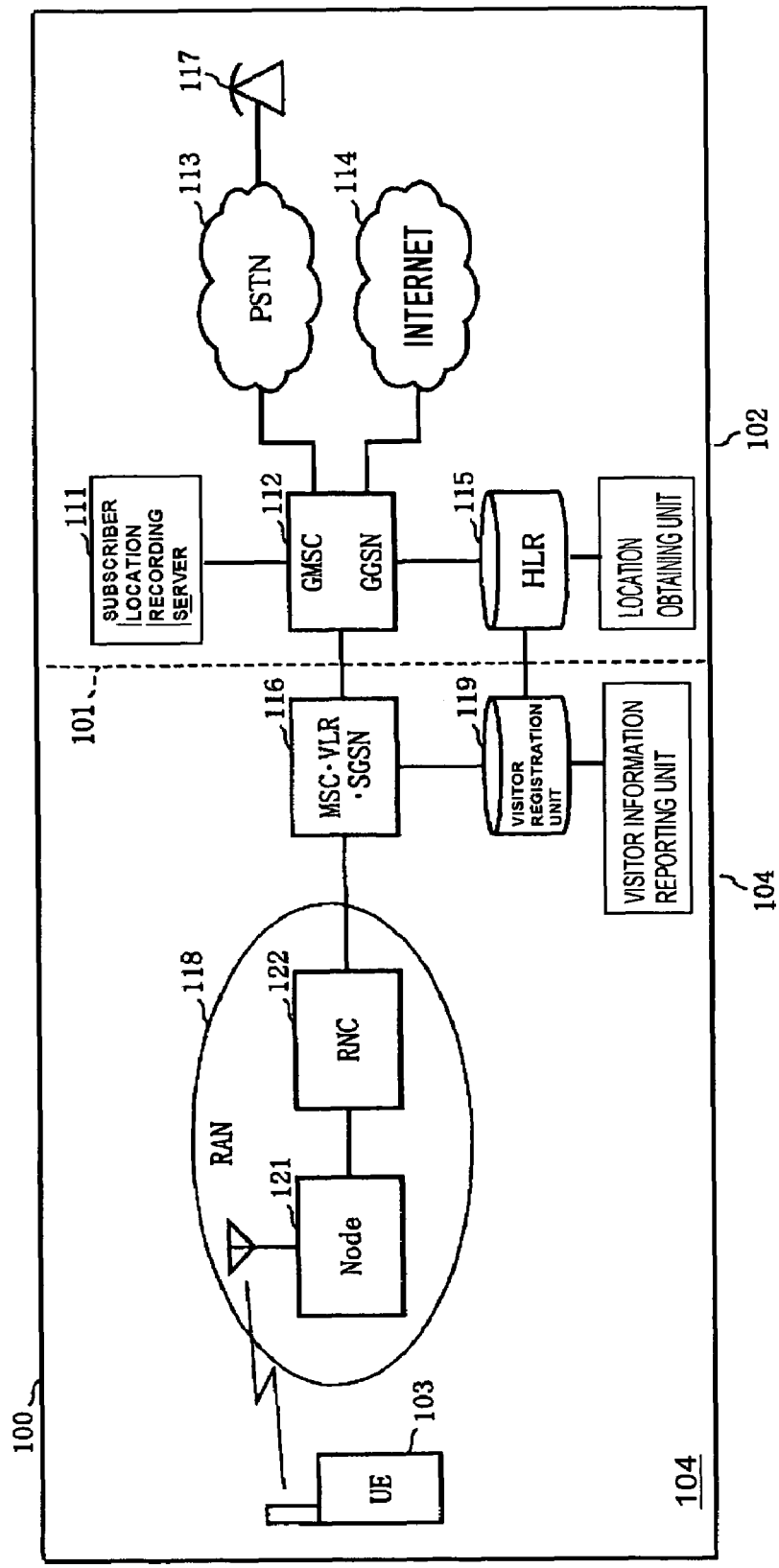
FIG. 1 is a block diagram showing a notification system according to the embodiment of the present invention.

FIG. 1 shows a notification system according to a first preferred embodiment of the present invention. The notification system 100 includes a first country mobile network 102 of a first country, to which a mobile station (UE) 103 originally belongs, and a second country mobile network 104 of a second (foreign) country, to which the mobile station 103 is moved. The first country mobile network 102 and the second country mobile network 104 are divided by a broken line 101 in FIG. 1.

The first country mobile network 102 includes a subscriber location recording server 111, a first country GMSC (Gateway Mobile Switching Center)/GGSN (Gateway General Packet Radio Service Support Node) unit 112, a PSTN (Public Switched Telephone Network) 113, INTERNET 114, a first country HLR (Home Location Register) 115, and a location obtaining unit 141.

The second country mobile network 104 includes a second country MSC (Mobile Switching Center)/VLR (Visitor Location Register)/SGSN (Serving General Packet Radio Service Support Node) unit 116, a RAN (Radio Access Network) 118, a visitor registration unit 119, and a visitor information reporting unit 140. The visitor registration unit 119 and the visitor information reporting unit 140 may have function of Common Language Runtime.

The subscriber location recording server 111 records whether a subscriber is within his or her own country, in this embodiment a first country, or within a foreign country, in this embodiment a second country. The subscriber location recording server 111 is capable of communicating with the PSTN 113, the INTERNET 114, the first country HLR 115, and the second country MSC/VLR/SGSN unit 116 included in the second country mobile network 104 via the first country GMSC/GGSN unit 112.

The first country HLR 115 stores data necessary for providing services to a subscriber or user of the mobile station 103. A telephone 117, shown as a fixed type telephone in this drawing, is connected to the PSTN 113.

Within the second country mobile network 104, the second country MSC/VLR/SGSN unit 116 connects the RAN 118, which functions as a radio wave cells, and the visitor registration unit 119. The RAN 118 includes a radio node 121 that communicates with the mobile station 103 when the mobile station 103 is within the second country, and a radio node controller 122 that controls the radio node 121. In this embodiment, the mobile station 103 is registered as a visitor station in the second country mobile network 104 so that the mobile station 103 is capable of communicating with the radio node 121 same as other stations, which are not shown in the drawings.

The visitor registration unit 119 registers the mobile station 103 as a visitor station in the second country mobile network 104 upon request from the mobile station 103 when the mobile station 103 is moved to the second country. The visitor information reporting unit 140 is capable of communicating with the location obtaining unit 141 included in the first county mobile network 102 and reports the registration of the mobile station 103 to the location obtaining unit 141 when the mobile station 103 is registered as a visitor station in the second country mobile network 104.

Although it is not shown in the drawings, the first country GMSC/GGSN unit 112, the second MSC/VLR/SGSN unit 116, the subscriber location recording server 111, the first country HLR 115, the location obtaining unit 141, the visitor information reporting unit 140, and the visitor registration unit 119 respectively include a CPU and a memory device such as a hard disc storing control programs so that each units are capable of executing its operations.

Figure 2:
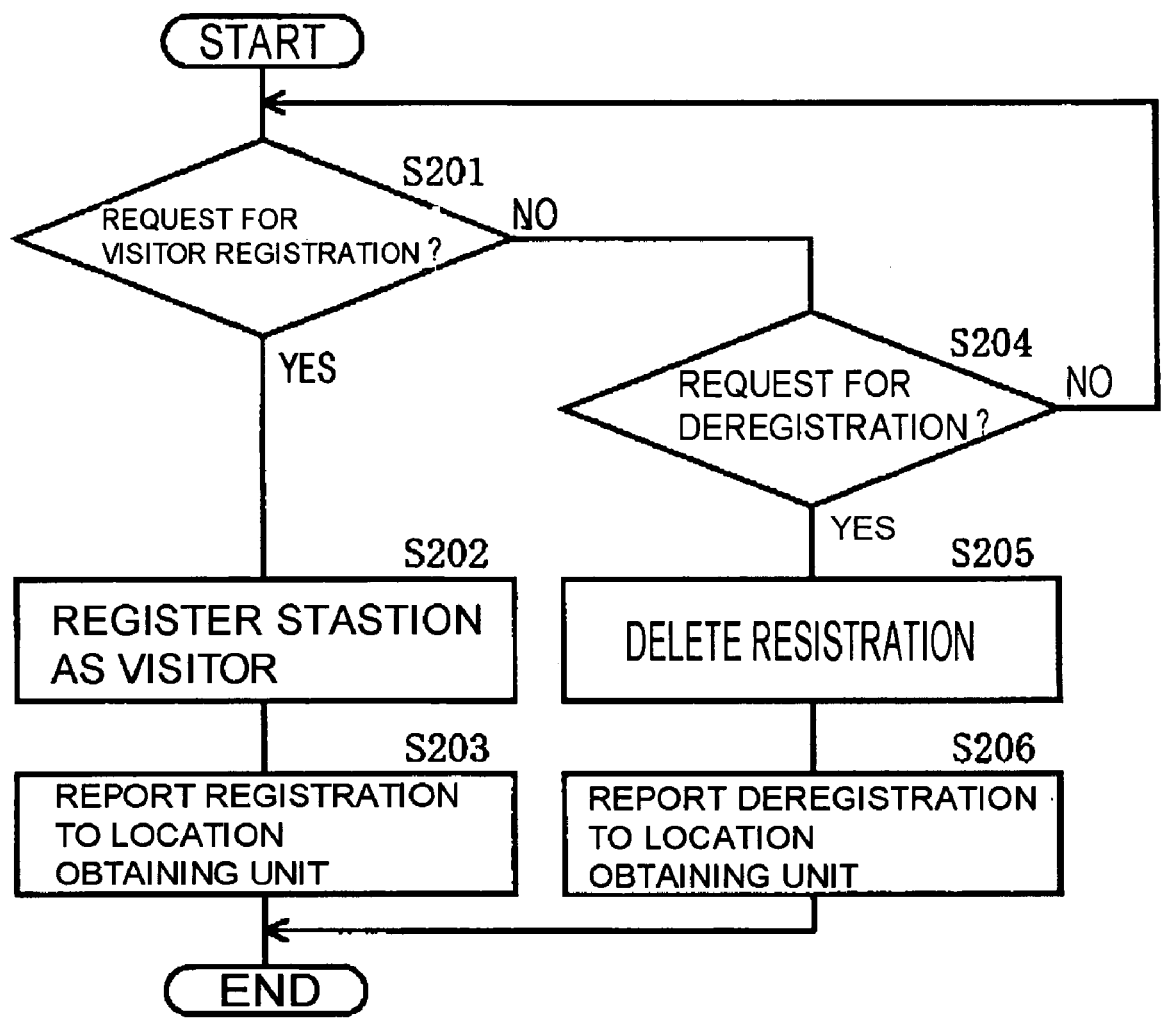
FIG. 2 is a flowchart showing the operation for having a mobile station registered or deregistered as a visitor station in the second country mobile network.

FIG. 2 is a flowchart showing the operation for having the mobile station 103 shown in FIG. 1 registered or deregistered as a visitor station in the second country mobile network 104 of the second country. When the mobile station 103 moves to the second country, the mobile station 103 becomes capable of making communications within the second country mobile network 104 after being registered as a visitor station in the second country mobile network 104. When the mobile station 103 requests a registration as a visitor station to the second country (Yes of step 201), the second country MSC/VLR/SGSN unit 116, shown in FIG. 1, registers the mobile station 103 as a visitor station in the visitor registration unit 119 (step 202). The visitor information reporting unit 140 reports the registration of the mobile station 103 to the location obtaining unit 141 of the first county mobile network 102, to which the mobile station 103 originally belongs (step 203). The visitor information reporting unit 140 is capable of communicating with the location obtaining unit 141 via any connection means such as INTERNET 114 or the like.

When the mobile station 103 which has been registered as the visitor station in the second country moves back to the first country, or moves to other country other than the second country, the mobile station 103 requests deregistration of the visitor station to the second country. When the second country MSC/VLR/SGSN unit 116 receives the request for the deregistration (Yes of step 204), the second country MSC/VLR/SGSN unit 116 deletes the registration of the mobile station 103 as the visitor station (Step 205). The visitor information reporting unit 140 reports the deregistration of the mobile station 103 to the location obtaining unit 141 (Step 206).

Figure 3:
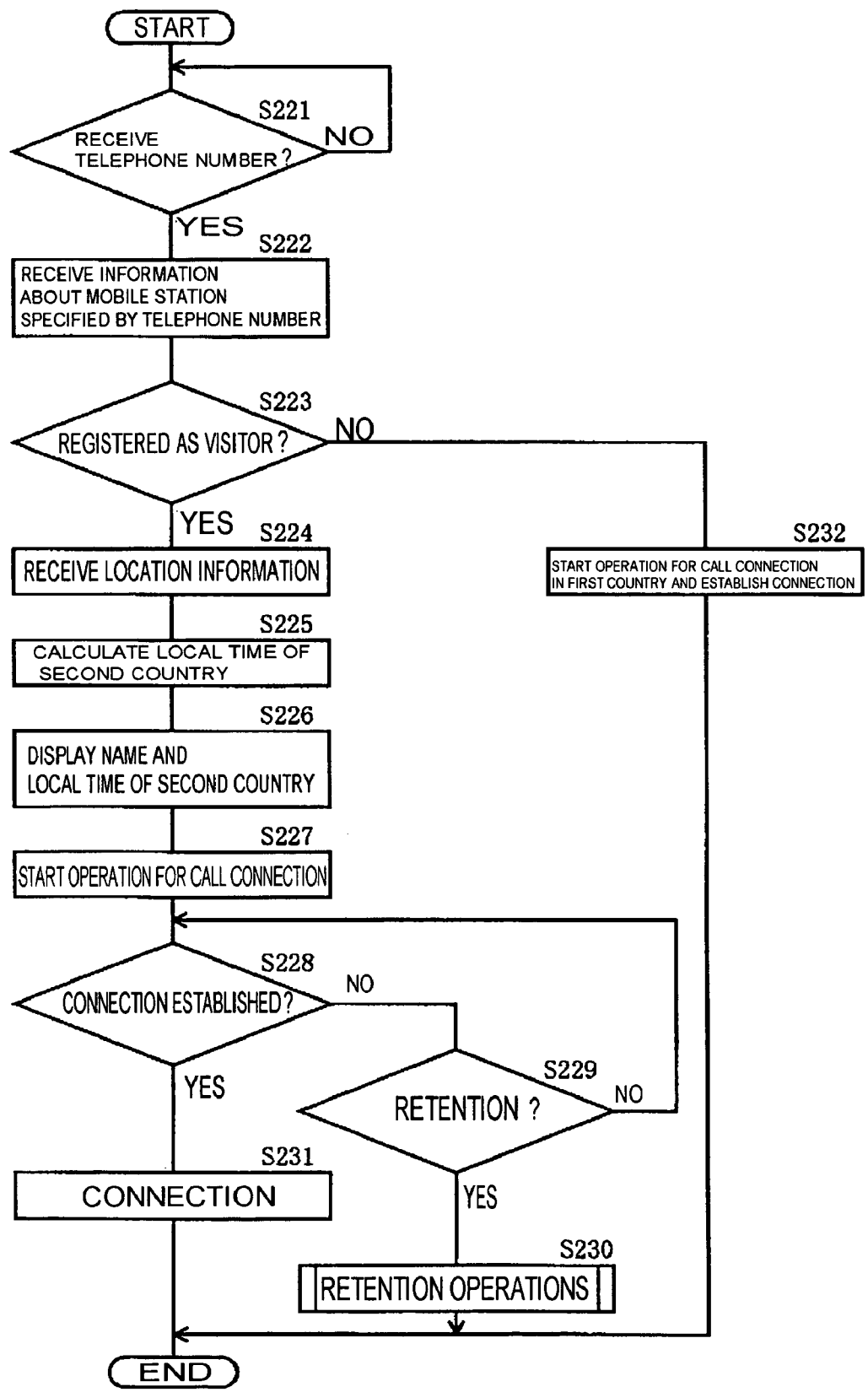
FIG. 3 is a flowchart showing the operation of the first country mobile network when the mobile station is registered as a visitor station in the second country.

FIG. 3 shows the operation of the first country mobile network 102 when the mobile station 103 is registered as a visitor station in the second country. The operation will be described with an example when a caller uses the fixed type telephone 117 shown in FIG. 1 to make a call to the mobile station 103. The caller may use any mobile phones or PHSs (personal handy phone systems) instead of the fixed type telephone 117.

The operation will be explained with reference to FIGS. 1 and 3 in the followings. When a caller using the telephone 117 dials whole of the telephone number of the mobile station 103, the first country GMSC/GGSN unit 112 receives the telephone number (Yes of step 221). The first country GMSC/GGSN unit 112 refers to the first country HLR 115 and receives the information about the mobile station specified by the telephone number, in this embodiment the mobile station 103 (step 222). The first country GMSC/GGSN unit 112 checks whether the information includes the fact that the mobile station 103 is registered as a visitor station in any foreign countries, in this embodiment the second country, or not (step 223). When the mobile station 103 is registered as the visitor station (yes of step 223), the first country GMSC/GGSN unit 112 refers to the subscriber location recording server 111 and receives the location information about the mobile station 103 (step 224). In this embodiment, the location information is country name of the second country. The first country GMSC/GGSN unit 112 may include a memory that stores a table showing country name of countries of the world and time difference between each countries and the first country. The memory may store information about summer time period for the countries that have summer time system.

The first country GMSC/GGSN unit 112 calculates local time of the second country based on the country name received from the subscriber location recording server 111 and the table stored in the memory (step 225). When the second country has several local times, the first country GMSC/GGSN unit 112 may calculate average time of the several local times. When the first country GMSC/GGSN unit 112 is capable of specifying a local area of the mobile station 103 in the second country, the first country GMSC/GGSN unit 112 may calculate the local time of the specified local area. By calculating the local time of the place where the mobile station 103 is moved, the caller can know the local time for the called person so that the caller can avoid calling the user of the mobile station 103 at his or her inconvenient time, such as midnight.

After the operation of step 225, the first country GMSC/GGSN unit 112 displays the country name and local time of the second country where the mobile station 103 is registered as the visitor station, on a display, not shown in the drawings, of the telephone 117 (step 226). Then, the first country GMSC/GGSN unit 112 starts operation for a call connection to the second country MSC/VLR/SGSN unit 116 (step 227).

The first country GMSC/GGSN unit 112 monitors whether the caller using the telephone 117 instructs the telephone 117 via an operating unit which is not shown in the drawings, to retain the call connection or not (step 229) while the operation for the call connection is being executed until the user of the mobile station 103 answer the call (No of step 228). When the retention of the call connection is instructed (Yes of step 229), the first country GMSC/GGSN unit 112 stops the operation for the call connection and executes some retention operations (step 230). The retention operations will be described in detail in the followings.

On the other hand, when the user of the mobile station 103 answers the call before the retention of the call connection is instructed (Yes of step 228), the connection between the telephone 117 and the mobile station 103 is established (step 231). Then, accounting operation for the call connection starts. It means that retention operations cannot be executed after the telephone 117 and the mobile station 103 are connected and accounting operation starts.

When the information received from the first country HLR 115 does not include the fact that the mobile station 103 is registered as a visitor station in some foreign countries (No of step 223), the first country GMSC/GGSN unit 112 starts operation for a call connection within a first county mobile network 102. When the user of the called mobile station 103 answers the call, the first country GMSC/GGSN unit 112 connects the telephone 117 and the mobile station 103 (step 232).

When a caller makes a call for the mobile station 103 by the telephone 117, the first country GMSC/GGSN unit 112 refers to the first country HLR 115. While the user of the mobile station 103 left the first country and arrived at the second country with the mobile station 103, before the mobile station 103 is registered as a visitor station, the first country HLR 115 does not store the information including the fact that the mobile station 103 is registered as a visitor station in the second country. Therefore, the first country GMSC/GGSN unit 112 tries to call the mobile station 103 as if the mobile station 103 is in the first country. This situation is same as a situation when a switch of the mobile station 103 is turned off or the mobile station 103 is located out of the service area of the Radio Access Network, not shown in the drawings, in the first country mobile network 102, and same announcement is send to the telephone 117. Same situation can happen when the user of the mobile station 103 requests for deregistration of the mobile station 103 as the visitor station in the second country before leaving the second country for other countries including the first country.

Figure 4:
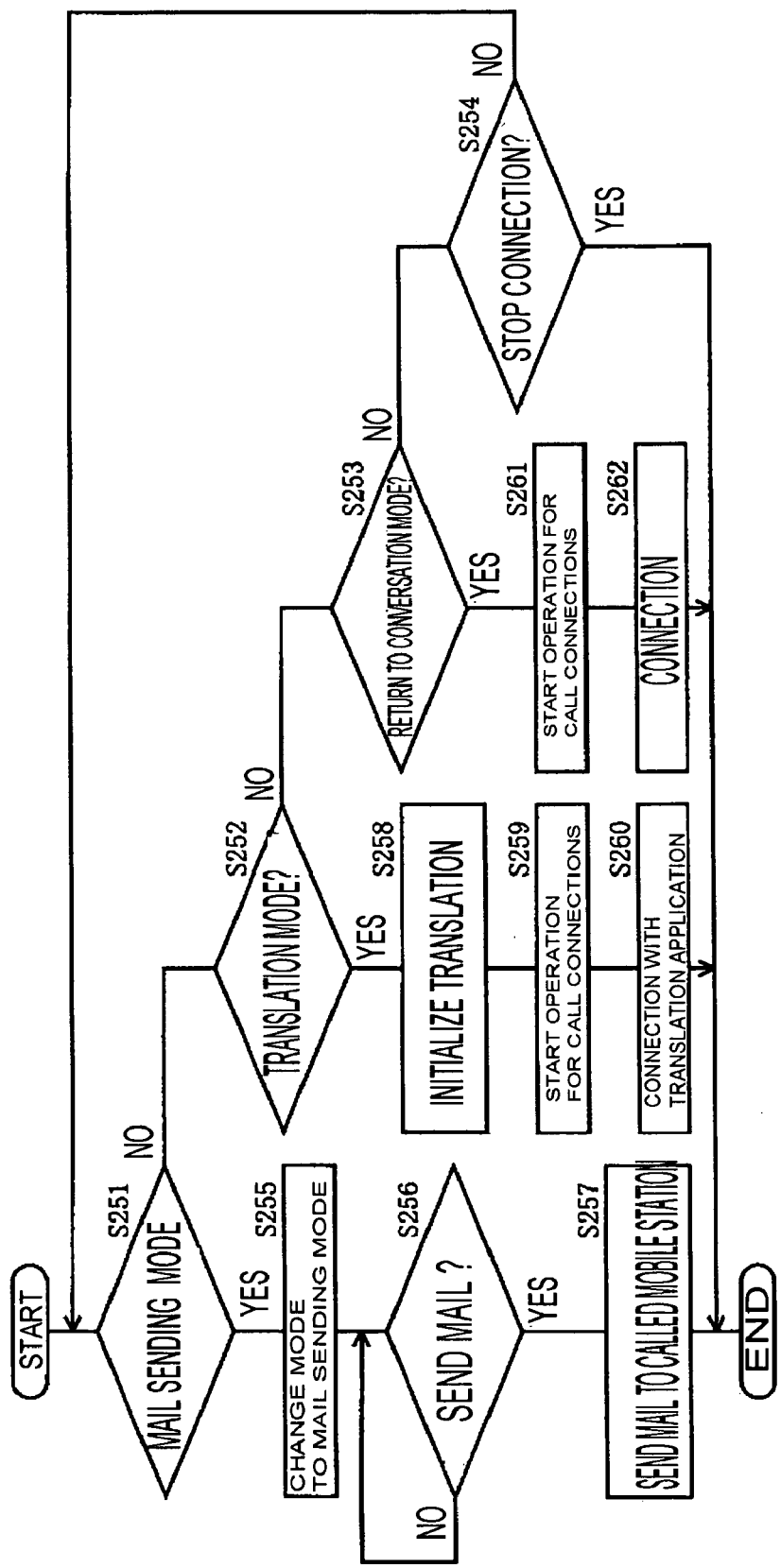
FIG. 4 is a flowchart showing the retention operations explained with referring to FIG. 3 in detail.

FIG. 4 shows the retention operations explained with referring to FIG. 3 in detail. The retention operation includes temporary retention of establishing connection and subsequent operations. The retention operations include a first operation by which the mode of the connection is changed from a conversation mode to a mail sending mode (step 251), a second operation by which the conversation between the caller using the telephone 117 and the user of the mobile station 103 is translated with an aid of translation function (step 252), a third operation by which the retention of the connection is finished and connection between the telephone 117 and the mobile station 103 is established (step 253), and a fourth operation by which the call connection is terminated (step 254).

When the caller using the telephone 117 selects the first retention operation (Yes of step 251), the first country GMSC/GGSN unit 112 changes the mode of the connection (step 255). The first country GMSC/GGSN unit 112 waits for the user of the telephone 117 to write a message of a mail (No of step 256). When the user finishes writing the massage (Yes of step 256), the first country GMSC/GGSN unit 112 searches and obtains the mail address of the mobile station 103 and sends the massage written by the user of the telephone 117 to the obtained address (step 257). With this operation, the user of the telephone 117 can save the connection charge by sending an electric mail instead of having conversation with the user of the mobile station 103 who is in a foreign country.

When the caller using the telephone 117 selects the second retention operation (Yes of step 252), the first country GMSC/GGSN unit 112 executes necessary operation for having the conversation between the users of the telephone 117 and the mobile station 103 translated in a preferred language. The first country GMSC/GGSN unit 112 may include a translation application program capable of translating the conversation between the users in their native language to the preferred language and outputting the translated language as voice information. When the first country GMSC/GGSN unit 112 includes such the application program, the first country GMSC/GGSN unit 112 initialize the application program (step 258). The first country GMSC/GGSN unit 112 may be included in a system in which a connection can be established among the users and a translation company where a translator of the translation company simultaneously translates the conversation between the users. In such the case, preparation for the translator is executed in step 258. Then, the first country GMSC/GGSN unit 112 starts establishing the connection between the telephone 117 and the mobile station 103 (Step 259). When the user of the mobile station 103 answers the call, the connection with the translation application program is established between the telephone 117 and the mobile station 103 (step 260).

When the caller using the telephone 117 selects the third retention operation (Yes of step 253), the first country GMSC/GGSN unit 112 finishes the retention operation and starts establishing the connection between the telephone 117 and the mobile station 103 (step 261). When the user of the mobile station 103 answers the call, the telephone 117 and the mobile station 103 are connected (step 262). With this operation, the user of the telephone 117 can have conversation with the user of the mobile station 103 after considering the telephone charge. In this operation, the conversations between the user of the telephone 117 and the mobile station 103 are not translated by the translation application or the translator as mentioned above. However, upon a request from either one of the users, their conversations can be translated by the translation application or the translator even after their connection is established.

When the caller using the telephone 117 selects the fourth retention operation (Yes of step 254), the first country GMSC/GGSN unit 112 finishes the retention operation and ends the operation without establishing the call connection.

Second Embodiment of the Present Invention

Figure 5:
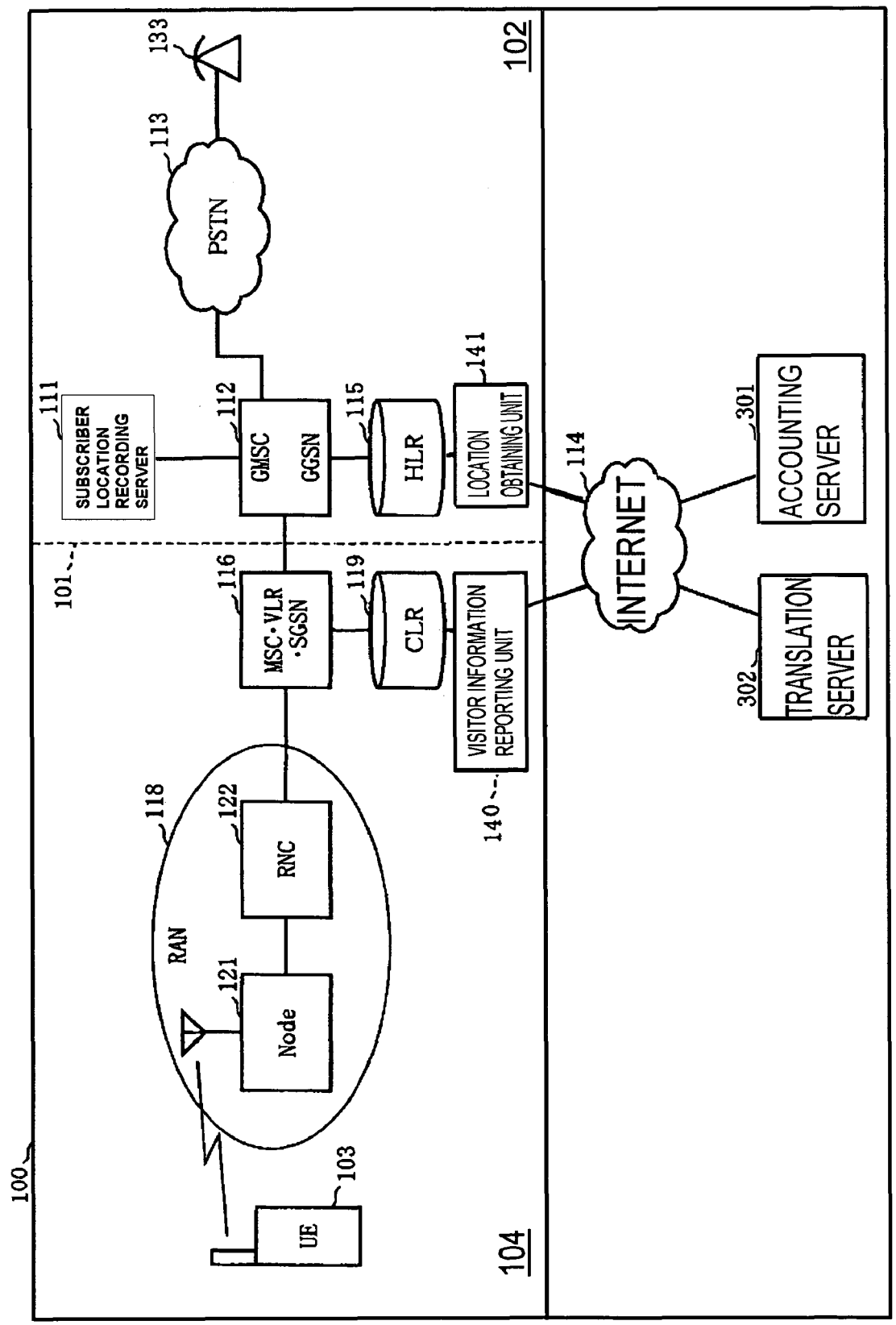
FIG. 5 is a block diagram showing a notification system according to the altered embodiment of the present invention.

FIG. 5 shows a notification system according to a second preferred embodiment of the present invention. Referring to FIG. 5, similar components to those illustrated in FIG. 1 referred to in the first embodiment are given the identical numerals, and description thereof shall be omitted as the case may be. In this embodiment, the first country HLR 115 and the visitor registration unit 119 are connected via the INTERNET 114. The notification system 100 of the present embodiment includes an accounting server 301 and a translation server 302 which are connected to the INTERNET 114.

In this embodiment, the visitor information reporting unit 140 reports the information about the mobile station 103 registered as the visitor station in the second country to the location obtaining unit 141 via the INTERNET 114. The information may include local location of the mobile station 103 in the second country expressed by a city code, an area code or the like, and a kind of a carrier that provides service for establishing a connection between the first country and the second country expressed by a carrier code, in addition to the country name as explained in the first embodiment.

Figure 6:
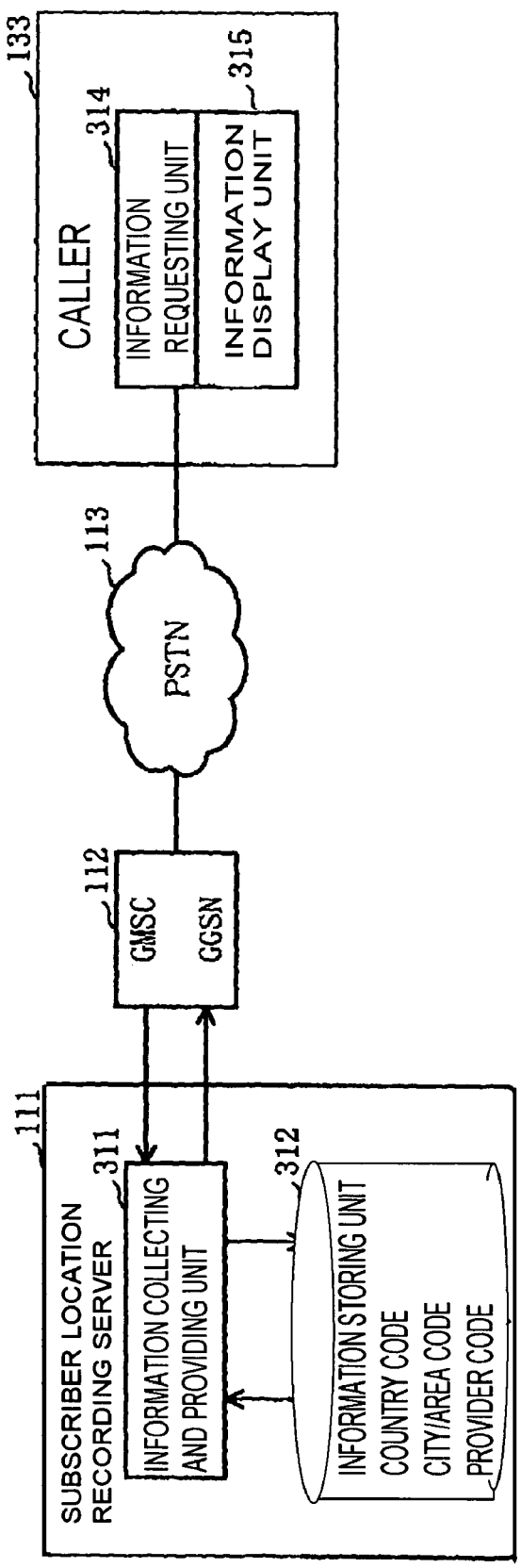
FIG. 6 is a block diagram showing the first country mobile network of the altered embodiment shown in FIG. 5 in detail.

FIG. 6 shows the first country mobile network 102 of the present embodiment shown in FIG. 5 in detail. The subscriber location recording server 111 includes a CPU and a memory device such as a hard disc storing control programs, which are not shown in the drawings. The subscriber location recording server 111 includes subscriber information collecting and providing unit 311 and a subscriber information storing unit 312. The subscriber location recording server 111 provides functions of the subscriber information collecting and providing unit 311 and the subscriber information storing unit 312 by executing the control programs stored in the memory device by the CPU. The subscriber information collecting and providing unit 311 is connected to the INTERNET 114 via the first country HLR 115 and is capable of communicating with the units of the second country. The subscriber location recording server 111 may be directly connected to the INTERNET 114.

The telephone 133 connected to the first country GMSC/GGSN unit 112 via the PSTN 113 includes a CPU and a memory device such as a hard disc storing control programs, which are not shown in the drawings. The telephone 133 includes an information requesting unit 314 that request the location information about the called mobile station, and an information display unit 315 that displays the location information about the called mobile station. The telephone 133 provides functions of the information requesting unit 314 and the information display unit 315 by executing the control programs stored in the memory device by the CPU.

In this embodiment, when the telephone 133 calls the mobile station 103 which is in the second country as shown in FIG. 5, the first country GMSC/GGSN unit 112 refers to the first country HLR 115 and receives the information about the mobile station 103. The first country GMSC/GGSN unit 112 detects that the information includes the fact that the mobile station 103 is registered as a visitor station in the second country in this embodiment (see step 223 of FIG. 3). If the user of the telephone 133 requests detail information about the mobile station 103 with the function of the information requesting unit 314 at this time, the first country GMSC/GGSN unit 112 receives the country code of the country where the mobile station 103 is located (in this embodiment the second country), the city code or the area code, and the carrier code that provides a mobile network to which the mobile station 103 connected from the subscriber location recording server 111. The telephone 133 displays the detail information on a display not shown in the drawings with the function of the information display unit 315. In this embodiment, the accounting server 301 shown in FIG. 5 may charge the telephone 133 for providing the detail information.

As the notification system 100 of the present embodiment includes the translation server 302 that has functions to translate conversation between users of the telephone 133 and the mobile station 103, the telephone 133 and the mobile station 103 do not necessary have translation functions by themselves. With the function of the translation server 302, even with a mobile station which does not have a translation function, the user can use the translation application of the translation server 302 on the INTERNET 302. Because of the translation server 302, practical, precise and rapid translation can be actualized even for users of mobile stations that does not include large scale of database for translation. The accounting server 301 may charge the telephone 133 or the mobile station 103 for using the translation server 302.

FIG. 7 shows the operation for selecting a carrier providing connection service between countries in this embodiment. In this operation, the user can select a preferred carrier. For example, the user may select a carrier who provides cheaper service, a carrier who provides faster transmission speed, or a carrier with high quality. This operation is executed within the retention operations explained in the first embodiment with reference to FIG. 4. In this embodiment, telephone fees are charged to the caller, the telephone 133. The accounting server 301 may charge the user for providing the information about the carrier.

One of the carriers capable of establishing a communication between the first country and the second country is displayed on the display, not shown in the drawings, of the telephone 133 as a default carrier (step 401). The telephone 133 receives an instruction by the user whether to establish a connection between the first country and the second country with the service of the default carrier (step 402). When the user of the telephone 133 selects the default carrier or does not care for the carrier, the user instructs the telephone 133 to establish the connection with the service of the default carrier (Yes of step 402). Then, the first country GMSC/GGSN unit 112 establishes a connection between the telephone 133 and the mobile station 103 with the service provided by the default carrier (step 403).

When the user of the telephone 133 decides not to use the default carrier (No of step 402), the telephone 133 asks the user whether to display a list of all of the carriers capable of establishing a communication between the first country and the second country (step 404). When the user selects to have the list of the carriers displayed on the display of the telephone 133 (Yes of step 404), the information display unit 315 shown in FIG. 6 displays the list (step 405). The list may include telephone fee, maximum data amount capable of transmitting and the like with the name or code of the carriers. The information display unit 315 may display the information about the carriers in order of fees or data amount capable for the carriers to transmit upon instruction of the user. When the user selects one of the carriers (Yes of step 406), the first country GMSC/GGSN unit 112 establishes a connection between the telephone 133 and the mobile station 103 with the service provided by the selected carrier (step 403).

The information display unit 315 may display weather information, map information etc. on the display of the telephone 133 by obtaining those information from information providing web pages on the INTERNET 144. Those information may be useful for the user of the telephone 133 in deciding which operation to be done among the retention operations explained with reference to FIG. 4. The user of the telephone 133 may access to the web pages even after a connection between the telephone 133 and the mobile station 103 is established when necessary.

The telephone 107 and the telephone 133 may be mobile stations, even those are explained as fixed type telephones in the above embodiments. When the telephone 107 and the telephone 133 are mobile stations, same operations will be executed.

Although the present invention has been described by way of exemplary embodiments, it should be understood that many changes and substitutions may further be made by those skilled in the art without departing from the scope of the present invention which is defined by the appended claims.

Although the present invention has been described by way of exemplary embodiments, it should be understood that many changes and substitutions may further be made by those skilled in the art without departing from the scope of the present invention which is defined by the appended claims.

What is claimed is:

1. A notification system for notifying information about a mobile station capable of using international roaming service, comprising:

an information storing unit that stores information about a mobile station which belongs to a first network in a first country, said information including a fact whether said mobile station is moved to a second country and registered as a visitor station in said second country or not;

a notification unit that refers to said information storing unit when said mobile station is called by a caller terminal within said first network to detect whether said mobile station is registered as said visitor station in said second country or not, and notifies said caller terminal of the registration of said mobile station before a connection between said caller terminal and said mobile station is established, when said mobile station is registered as said visitor station in said second country;

a location obtaining unit that obtains location of said mobile station; a visitor registration unit that registers said mobile station as a visitor station in said second country to have said mobile station capable of establishing a connection via a second network in said second country when said mobile station moves to said second country and requests for the registration;

a reporting unit that reports said registration of said mobile station to said location obtaining unit;

a retaining unit that temporarily retains establishing a connection between said caller terminal and said mobile station; and a mode changing unit that changes a mode of a connection between said caller terminal and said mobile station from a conversation mode to a text-based mail sending mode upon receiving a request from said caller terminal, wherein the conversation mode includes a translation mode, and when the user of said caller terminal selects said changing the mode to the translation mode, said retaining unit restarts said connection, between said caller terminal and said mobile station after preparation for the translation is executed, wherein after the retaining unit temporarily retains establishing the connection between said caller terminal and said mobile station, said mode changing unit that-changes from the conversation mode to the text-based mail sending mode upon receiving the request from said caller terminal, the notification system allows said caller terminal to write and send a text-based mail message to said mobile station, and wherein said location obtaining unit stores information about said registration of said mobile station in said information storing unit.

2. A notification system as set forth in claim 1, further comprising a calculating unit that calculates telephone fee charged to said caller terminal when said connection between said caller terminal and said mobile station registered as said visitor station in said second country is established, wherein said notification unit notifies said caller terminal of the telephone fee calculated by said accounting unit in addition to said registration before said connection between said caller terminal and said mobile station is established, when said mobile station is registered as a visitor station in said second country.

3. A notification system as set forth in claim 2, further comprising:
- a location obtaining unit that obtains location of said mobile station;
- a visitor registration unit that registers said mobile station as a visitor station in said second country to have said mobile station capable of establishing a connection via a second network in said second country when said mobile station moves to said second country and requests for the registration; and
- a reporting unit that reports said registration of said mobile station to said location obtaining unit, wherein said location obtaining unit stores information about said registration of said mobile station in said information storing unit.

4. A notification system as set forth in claim 1, wherein said visitor registration unit deletes said registration of said mobile station as said visitor station upon receiving request from said mobile station, said reporting unit reports said deletion of said registration of said mobile station to said location obtaining unit, and said location obtaining unit deletes said information about said registration information in said information storing unit.

5. A notification system as set forth in claim 3, wherein said visitor registration unit deletes said registration of said mobile station as said visitor station upon receiving request from said mobile station, said reporting unit reports said deletion of said registration of said mobile station to said location obtaining unit, and said location obtaining unit deletes said information about said registration information in said information storing unit.

6. A notification system as set forth in claim 1, further comprising an accounting unit that charges said caller terminal for notification of said notification unit.

7. A notification system as set forth in claim 2, further comprising an accounting unit that charges said caller terminal for notification of said notification unit.

8. A notification system as set forth in claim 1, further comprising a time calculation unit that calculates local time of said second country, wherein said notification unit notifies said caller terminal of said local time in addition to said registration, when said mobile station is registered as a visitor station in said second country.

9. A notification system as set forth in claim 2, further comprising a time calculation unit that calculates local time of said second country, wherein said notification unit notifies said caller terminal of said local time in addition to said registration, when said mobile station is registered as a visitor station in said second country.

10. A notification system as set forth in claim 1, further comprising a translation unit that aids translation of conversations between users of said caller terminal and said mobile station.

11. A notification system as set forth in claim 2, further comprising a translation unit that aids translation of conversations between users of said caller terminal and said mobile station.

* * * * *